(12) United States Patent
Banerjee et al.

(10) Patent No.: US 10,235,288 B2
(45) Date of Patent: Mar. 19, 2019

(54) CACHE FLUSHING AND INTERRUPTED WRITE HANDLING IN STORAGE SYSTEMS

(71) Applicant: NetApp, Inc., Sunnyvale, CA (US)

(72) Inventors: Arindam Banerjee, Boulder, CO (US); Donald R Humlicek, Wichita, KS (US); Scott Terrill, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 50 days.

(21) Appl. No.: 14/874,157

(22) Filed: Oct. 2, 2015

(65) Prior Publication Data

US 2017/0097886 A1     Apr. 6, 2017

(51) Int. Cl.
| | |
|---|---|
| *G06F 12/00* | (2006.01) |
| *G06F 12/0804* | (2016.01) |
| *G06F 12/12* | (2016.01) |
| *G06F 12/0868* | (2016.01) |
| *G06F 12/0891* | (2016.01) |
| *G06F 12/126* | (2016.01) |

(52) U.S. Cl.
CPC ...... *G06F 12/0804* (2013.01); *G06F 12/0868* (2013.01); *G06F 12/0891* (2013.01); *G06F 12/12* (2013.01); *G06F 12/126* (2013.01); *G06F 2212/604* (2013.01)

(58) Field of Classification Search
CPC .................................................. G06F 12/0804
See application file for complete search history.

(56) References Cited

U.S. PATENT DOCUMENTS

| | | | | |
|---|---|---|---|---|
| 5,408,644 | A | * | 4/1995 | Schneider ........... G06F 12/0804 711/E12.019 |
| 5,542,066 | A | * | 7/1996 | Mattson ............... G06F 12/0804 711/113 |
| 5,895,488 | A | | 4/1999 | Loechel |
| 6,223,301 | B1 | * | 4/2001 | Santeler ................ G06F 11/108 714/6.2 |
| 6,691,209 | B1 | * | 2/2004 | O'Connell ............ G06F 3/0604 700/200 |
| 7,454,567 | B2 | | 11/2008 | Kazar et al. |
| 7,761,659 | B2 | | 7/2010 | Lubbers et al. |

(Continued)

OTHER PUBLICATIONS

PCT, Application No. PCT/US2016/054415, International Search Report and Written Opinion, dated Feb. 24, 2017, 16 pgs.

*Primary Examiner* — Adam M Queler
*Assistant Examiner* — Trang K Ta
(74) *Attorney, Agent, or Firm* — Haynes and Boone, LLP

(57) ABSTRACT

Systems and techniques for cache management are disclosed that provide improved cache performance by prioritizing particular storage stripes for cache flush operations. The systems and techniques may also leverage features of the storage devices to provide atomicity without the overhead of inter-controller mirroring. In some embodiments, the systems and techniques include a storage controller that stores data in a cache. The data is associated with one or more sectors of a storage stripe that is defined over plurality of storage devices. The storage controller identifies a locality of dirty sectors of the one or more sectors, classifies the storage stripe into a category based on the locality, provides a category ordering of the category relative to at least one other category, and flushes the storage stripe from the cache to the plurality of storage devices according to the category ordering.

23 Claims, 4 Drawing Sheets

(56) References Cited

U.S. PATENT DOCUMENTS

| | | |
|---|---|---|
| 8,370,562 B2 | 2/2013 | Lasser |
| 2003/0120869 A1 | 6/2003 | Lee et al. |
| 2006/0184740 A1* | 8/2006 | Ishikawa ............... G06F 12/084 |
| | | 711/129 |
| 2008/0183963 A1* | 7/2008 | He ...................... G06F 11/1092 |
| | | 711/114 |
| 2008/0215834 A1 | 9/2008 | Dumitru et al. |
| 2012/0096237 A1* | 4/2012 | Punkunus ............. G06F 3/0613 |
| | | 711/209 |
| 2013/0036277 A1* | 2/2013 | Szczepkowski ...... G06F 3/0608 |
| | | 711/159 |
| 2014/0281151 A1* | 9/2014 | Yu ............................ G06F 1/30 |
| | | 711/103 |
| 2014/0365725 A1* | 12/2014 | Barrell ................ G06F 11/1076 |
| | | 711/113 |
| 2014/0379990 A1* | 12/2014 | Pan .................... G06F 12/0804 |
| | | 711/135 |
| 2015/0199151 A1* | 7/2015 | Klemm ................ G06F 3/0689 |
| | | 711/114 |

* cited by examiner

CACHE FLUSHING AND INTERRUPTED WRITE HANDLING IN STORAGE SYSTEMS

TECHNICAL FIELD

The present description relates to data storage and retrieval and, more specifically, to techniques and systems for cache flushing and interrupted write handling by a storage controller.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput.

Conventional storage devices include caching technology to utilize faster cache memory rather than slower disk drive memory for input/output (IO) operations. As data is written to cache memory and cache memory fills up, cache flushing is used to migrate data from the cache memory to storage devices such as hard disk drives (HDDs) or solid state drives (SDDs). Traditional cache flushing algorithms designed for HDDs sort data stored in the cache memory in ascending order of HDD logical block addressing (LBA). LBA-based sorting is intended to minimize head seeks while performing I/O to the HDDs.

The traditional LBA-based sorting algorithm, however, is not as effective with improved storage technology, such as all-flash arrays and hybrid arrays with SSDs. This is because SSDs do not have mechanical read/write heads that seek to tracks to perform I/O. Rather, SSDs access media using memory offsets, which improves input/output operations per second (IOPS).

Therefore, in order to provide optimal caching performance with improved storage technology, a need exists for systems and techniques for cache flushing that make efficient use of the improved storage technology. In particular, systems and methods that optimize cache flushing for improved storage technology would provide a valuable improvement over conventional storage systems. Thus, while existing storage systems have been generally adequate, the techniques described herein provide improved performance and efficiency.

BRIEF DESCRIPTION OF THE DRAWINGS

The present disclosure is best understood from the following detailed description when read with the accompanying figures.

DETAILED DESCRIPTION

Figure 1:
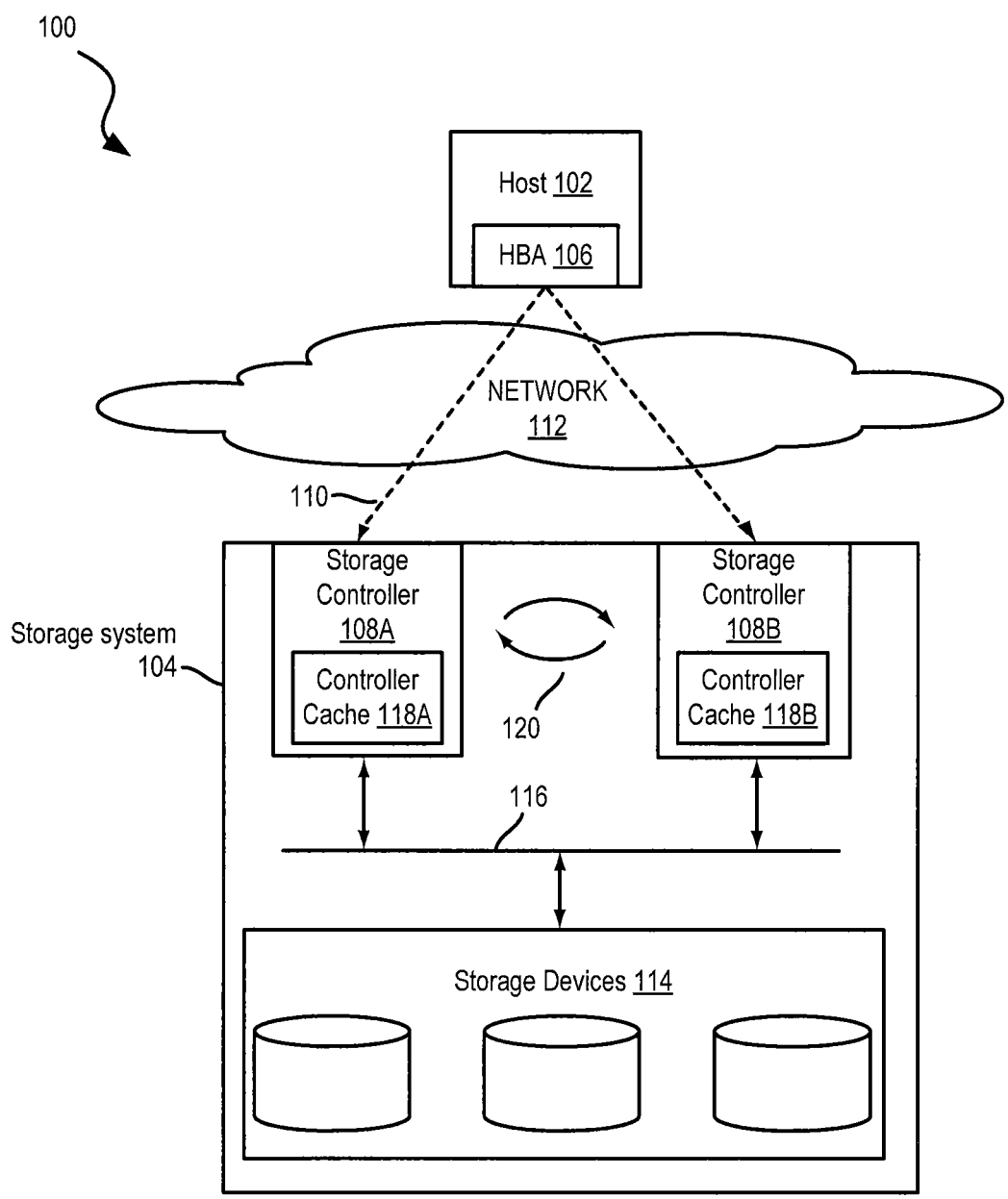
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments provide a system, method, and machine-readable medium for a storage system that performs cache flushing in a storage system that is configured with storage devices such as SSDs. Specifically, information corresponding to the amount of dirty sectors and the locality of the dirty sectors within data segments and storage stripes is identified for data stored in a controller cache. A storage controller uses the locality and/or amount information to identify storage stripes where efficiency for cache flushing may be improved by grouping cache flushing operations of the dirty sectors into a cache flush of a data segment and/or storage stripe. The identified storage stripes are classified into full stripe write and partial stripe write categories that are prioritized for cache flushing operations. This is beneficial in reducing the number of I/O operations that are performed to flush the controller cache to the storage devices.

The embodiments disclosed herein may provide several advantages. First, flushing a larger portion of data that includes multiple dirty sectors, such as a storage stripe and/or data segment, may avoid at least one data segment read and write operation. Second, flushing a larger portion of data, such as a storage stripe and/or data segment, that includes multiple dirty sectors may avoid at least one parity read and write operation. The number of avoided I/O operations may be higher based upon a number of dirty sectors in a data segment and/or storage stripe. Further, the number of I/O operations may also be higher for RAID 6 and other multiple-parity schemes. A storage controller may operate more efficiently and reduce latency in responding to hosts by reducing the number of I/O operations to perform cache flushing. In addition, reducing the number of writes that are performed to SSDs may also increase the life span of the SSDs, which may have a limited write cycle (for example, the SSDs may only be able to sustain a given number of writes during their life cycle). Of course, it is understood that these features and advantages are shared among the various examples herein and that no one feature or advantage is required for any particular embodiment.

FIG. 1 is a schematic diagram of an exemplary storage architecture 100 according to aspects of the present disclosure. The storage architecture 100 includes a host 102 in communication with a storage system 104. It is understood that for clarity and ease of explanation, only a single host 102 and a single storage system 104 are illustrated, although any number of hosts 102 may be in communication with any number of storage systems 104. Furthermore, while the storage system 104 and the host 102 are referred to as singular entities, a storage system 104 and/or host 102 may include any number of computing devices and may range from a single computing system to a system cluster of any size. Accordingly, each host 102 and storage system 104 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the host 102, host 102 includes any computing resource that is operable to exchange data with a storage system 104 by providing (initiating) data transactions to the storage system 104. In an exemplary embodiment, a host 102 includes a host bus adapter (HBA) 106 in communication with storage controllers 108A and 108B of the storage system 104. In other embodiments, HBA 106 may be connected to one or more storage controllers. For example, HBA 106 may be connected to storage controllers of a plurality of storage systems. The HBA 106 provides an interface for communicating with the storage controllers 108A and 108B, and in that regard, may conform to any suitable hardware and/or software protocol. In various embodiments, the HBAs 106 include Serial Attached SCSI (SAS), iSCSI, InfiniBand, Fibre Channel and/or Fibre Channel over Ethernet (FCoE) bus adapters. Examples of other protocols include SATA, eSATA, PATA, USB, Wi-Fi and FireWire.

Communications paths between the HBAs 106 and the storage controllers 108A and 108B are referred to as links 110. A link 110 may take the form of a direct connection (e.g., a single wire or other point-to-point connection), a networked connection, or any combination thereof. Thus, in some embodiments, one or more links 110 traverse a network 112, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, a host 102 has multiple links 110 with a single storage controller 108A for redundancy. The multiple links 110 may be provided by a single HBA 106 or multiple HBAs 106. In some embodiments, multiple links 110 operate in parallel to increase bandwidth.

To interact with (e.g., read, write, modify, etc.) remote data, a host 102 sends one or more data transactions to the respective storage system 104 via a link 110. Data transactions are requests to read, write, or otherwise access data stored within a data storage device such as the storage system 104, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Turning now to the storage system 104, the exemplary storage system 104 contains any number of storage devices 114 and responds to data transaction requests from hosts 102. In some examples, the storage system 104 is structured to make the storage devices 114 appear to be directly connected (local) to the hosts 102.

The storage system 104 may group the storage devices 114 for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 102. In this way, the storage system 104 represents the group of devices as a single device, often referred to as a volume. Thus, a host 102 can access the volume without concern for how it is distributed among the underlying storage devices 114.

For example, a storage controller 108A and/or 108B may be structured to store data on the storage devices 114 using a data protection scheme such as RAID 1 (mirroring), RAID 5 (striping with parity), or RAID 6 (striping with double parity). To do so, data is divided into stripes and divided again into data segments and parity segments. Each data segment and parity segment represents the portion of a stripe allocated to a particular storage device 114, and while the data segments and parity segments may have any suitable size (e.g., 64K, 128K, 256K, 512K, etc.), they are typically uniform across storage devices 114. Data segments are again divided into data sectors, which are typically uniform blocks of the data segments that are allocated to store particular data.

In various examples, the underlying storage devices 114 include hard disk drives (HDDs), solid state drives (SSDs), optical drives, and/or any other suitable volatile or non-volatile data storage medium. In some examples, the storage devices 114 include all-flash storage devices or all SSDs. In other embodiments, storage devices 114 include hybrid storage device configurations, such as by including both HDDs and SDDs.

The storage system 104 also includes one or more storage controllers 108A and 108B in communication with the storage devices 114. The storage controllers 108A and 108B exercise low-level control over the storage devices 114 in order to execute (perform) data transactions on behalf of the hosts 102. In the illustrated embodiment, the storage system 104 includes two storage controllers 108A and 108B in communication with a number of storage devices 114 via a backplane 116.

In addition to data handling and processing resources, storage controller 108A may include a controller cache 118A and storage controller 108B may include a controller cache 118B. Controller caches 118A and 118B may be used to store data to be written to or read from the storage devices 114. The controller caches 118A and 118B are typically much faster to access than the storage devices 114 and provide mechanisms that expedite transaction processing. The controller caches 118A and 118B may include any volatile or non-volatile storage medium and common examples include resistive RAM (RRAM), phase-change RAM (PCRAM), flash memory (e.g., NAND/NOR flash memory), battery-backed DRAM, and/or other storage media. In some examples, the controller caches 118A and 118B include Storage Class Memory (SCM), a class of high-speed byte-addressable or block-addressable non-volatile memory devices that utilize any of a variety of storage technologies to provide latencies an order of magnitude faster (or more) than conventional flash SSDs. The high bandwidth and low latency of SCMs make them well-suited for use as a data cache in high-performance applications. SCMs are also suitable for use as non-cache storage devices 114, and in some embodiments, the storage system 104 is an all-SCM storage system that includes Storage Class Memories for the storage devices 114 as well as the controller caches 118A and 118B.

Controller caches 118A and 118B are structured to hold data before the data is written to storage 114. For example, an operation to write data to storage 114 may first write the data to a controller cache 118A and/or 118B. The data may be temporarily stored in the controller cache 118A and/or 118B, to allow fast access to the data by the host 102 and/or storage system 104. Data stored in cache memory is associated with storage stripes, data segments, and/or data sectors corresponding to locations of storage 114. For example, data stored in cache memory may be assigned to a particular storage stripe of storage 114, particular segments of storage 114, and particular data sectors of storage 114, and accordingly are associated with the particular storage stripe, segments, and data sectors in cache memory. In some examples, controller caches 118A and 118B associate data with locations of storage 114 using one or more mappings, such as a metadata tables. In other examples, controller caches 118A and 118B associate data with locations of storage 114 using one or more algorithms. In yet other examples, controller caches 118A and 118B associate data with locations of storage 114 using combinations of mapping and algorithm methods.

In some examples, multiple copies of transaction data are stored in the controller caches 118A and 118B of the storage controllers 108A and 108B. Thus, in an embodiment, a first storage controller 108A may store a copy of the data and/or metadata in its controller cache 118A prior to performing the transaction on the storage devices 114. The first storage controller 108A may also provide the data and/or metadata to a second storage controller 108B over an inter-controller bus 120 for storing in the second controller's cache 118B. This is referred to as mirroring, and accordingly, the inter-controller bus 120 may be referred to as a mirror channel. This duplication may take place before the data is written to the storage devices 114. In this way, the storage system 104 can recreate the transaction should either storage controller 108A or 108B fail before the write to storage is complete.

Once the second storage controller 108B has cached a redundant copy of the transaction's data and/or metadata, the storage system 104 may provide the initiating host 102 with a transaction completion response even if the transaction has not yet written to the storage device 114. To the host 102, a transaction may not be safely received until the redundant copy is made because before that point, the transaction may be lost if the first storage controller 108A fails. After the copy is made and the completion response is received, however, a host 102 application may proceed and may rely on the guarantee that the storage system 104 can recover the transaction from the duplicate copy. It is understood that further embodiments may expand on this redundancy by applying these principles to groups of three or more storage controllers or three or more copies of the data/metadata.

Controller caches 118A and 118B are structured to write data from the caches to the locations associated with the data in storage 114, in what is referred to as cache flushing. For example, the storage controllers 108A and/or 108A are structured to flush data from the caches 118A and 118B to storage based on predefined triggers. In some examples, each of the storage controllers 108A and 108B is structured with firmware that executes instructions stored in a computer-readable memory to cache data, identify when predefined trigger conditions are met, and perform the cache flushing. After performing cache flushing, the data may be accessed from storage 114. A system and technique for providing cache flushing using the controller caches 118A and 118B is further described with reference to FIGS. 2, 3A, 3B, 3C and 4.

Figure 2:
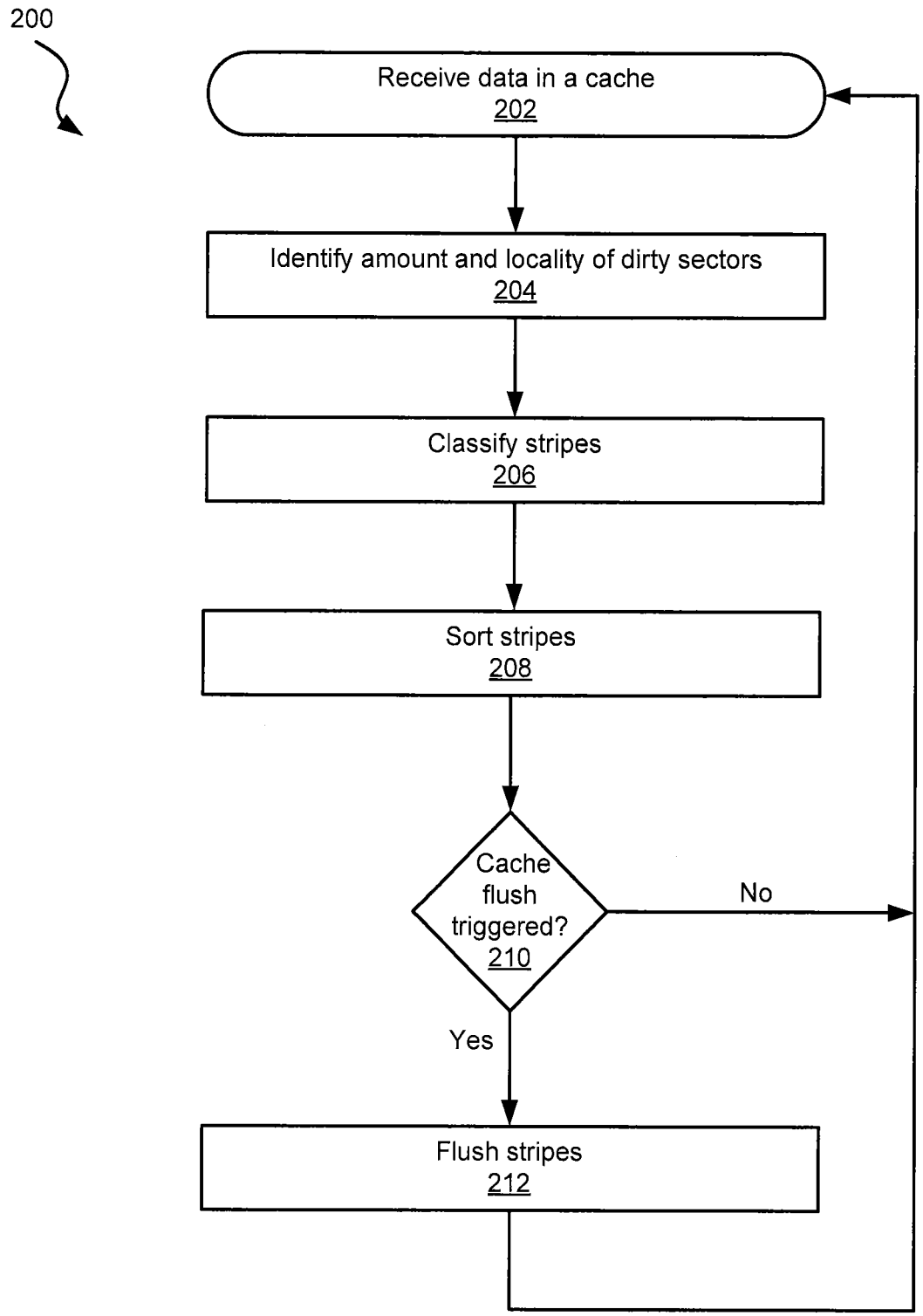
FIG. 2 is a flow diagram of a method of flushing a cache according to aspects of the present disclosure.

FIG. 2 is a flow diagram illustrating a method for flushing a cache, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 200, and some of the steps described can be replaced, eliminated and/or re-ordered for other embodiments of the method 200.

Referring first to action 202, a data transaction is received by a storage controller (e.g., storage controller 108A and/or 108B) of the storage system (e.g., storage system 104) from a host (e.g., host 102). The data transaction may include a request to read, write, or otherwise access data stored on the storage devices (e.g., storage devices 114), and may contain fields that encode a command, data, metadata, and/or any other relevant information. A storage controller caches some portion of the data and/or metadata associated with a data transaction in a cache (e.g., controller cache 118A and/or 118B). In some embodiments, both data and metadata are stored in the cache. In some examples, the hottest data (data expected to be read or written again in the near future) is stored in the cache.

At action 204, the storage controller identifies an amount of dirty sectors for a given stripe or stripes in the cache and the locality of the dirty sectors.

A sector of a cache may refer to a portion of cache memory that is included in a data segment assigned to a storage device. A sector may be referred to as a dirty sector if it contains new data that has not been written to a storage device. A sector may be referred to as a clean sector if it contains data that has been written to a storage device.

In some examples, identifying an amount of dirty sectors in the cache for a given stripe or stripes includes determining a percentage of the cache that includes dirty sectors relative to clean sectors or to the total size of the stripe. In some examples, the storage controller may identify that greater than a threshold percentage of the cache for a given stripe includes dirty sectors. For example, the threshold may be that the cache includes about 6% dirty sectors for the given stripe.

In some examples, identifying a locality of dirty sectors in the cache for a given stripe includes determining a storage device location with which each of the dirty sectors of the cache are associated. For example, a locality of a dirty sector of a cache may be identified as corresponding to a particular data segment of a particular storage stripe of one or more storage devices. Identifying a locality of a dirty sector may further include identifying whether the dirty sector is contiguous or non-contiguous with other dirty sectors. Dirty sectors may be identified as contiguous with other dirty sectors if, for example, the dirty sectors are not separated by any clean or missing sectors. Identifying a locality of a dirty sector may further include identifying a number of dirty sectors associated with a data segment or data stripe, and/or an amount of data segments in a data stripe that include dirty sectors.

In some examples, the storage controller may identify that at least one data segment of the storage stripe includes contiguous dirty sectors. In other examples, the storage controller may identify that each data segment of the one or more data segments includes at least one dirty sector. In yet other examples, the storage controller may identify that a plurality of data segments of the storage stripe include at least one dirty sector. In yet other examples, the storage controller may identify that a predefined threshold amount of dirty sectors in a data segment or storage stripe is exceeded.

The storage controller may also use the identified locality of the dirty sectors to determine whether to perform a partial stripe write or a full stripe write. For example, the storage controller may compare a number of I/O operations to perform a partial stripe write of the storage stripe to the plurality of storage devices with a number of I/O operations to perform a full stripe write of the storage stripe to the plurality of storage devices. The storage controller may determine whether the number of I/O operations corresponding to a partial stripe write is greater than a number of I/O operations corresponding to a full stripe write. A partial stripe write may include, for example, a write of dirty sectors of a cache that correspond to a data stripe where the entire data stripe is not written to the storage device. A full stripe write may include, for example, a write of dirty sectors of a cache that correspond to a data stripe where the entire data stripe is written to the storage device.

At action 206, the storage controller classifies storage stripes into categories based on the identified amount and/or locality information. In some examples, categories include a full stripe write category, a partial stripe write category and a default category. In other examples, there may be additional or fewer categories. In these examples, the full stripe write category may be a high priority category, the partial stripe write category may be a medium priority category, and the default category may be a low priority category. In the present example, storage stripes assigned to higher priority categories are configured to be flushed from the cache to storage devices prior to storage stripes assigned to lower priority categories.

In some examples, a storage stripe is classified into the full stripe write category if each data segment of the storage stripe includes at least one dirty sector. Since each storage device has dirty sectors, a flush will access each device regardless of whether full write is performed or a series of partial writes for each device. However, because a full write involves fewer transactions, performing a full stripe write provides a performance advantage over performing a series of partial stripe writes. In other examples, a storage stripe is classified into the full stripe write category if at least two data segments of the storage stripe include at least one dirty sector, a data segment includes at least two contiguous dirty sectors, and/or the storage stripe includes at least a predefined threshold amount of dirty sectors. For example, the predefined threshold may be about 6%. In yet other examples, a storage stripe is classified into the full stripe write category based on a combination of one or more of the above criteria. In another example, a storage stripe is classified into the full stripe write category if a majority (or all) of the data sectors of the storage stripe are dirty or when a number of I/O operations to perform a partial stripe write are greater than a number of I/O operations to perform a full stripe write. Examples regarding comparing numbers of I/O operations for a partial stripe write and a full stripe write are described in further detail with respect to FIGS. 3A, 3B and 3C.

In some examples, a storage stripe is classified into the partial stripe write category if the storage stripe does not meet the criteria for the full stripe write, but does include at least two dirty sectors within a stripe. In other examples, a storage stripe is classified into the partial stripe write category if the storage stripe does not meet the criteria for the full stripe write, but does include at least two dirty sectors in a segment of the storage stripe.

In some examples, a storage stripe is classified into a default category if it does not meet the criteria for classification into the full stripe write category or the partial stripe write category.

At action 208, the storage stripes are sorted into a cache flush ordering. In some examples, the storage stripes classified into the full stripe write category are ordered prior to, or prioritized, over storage stripes classified into the partial stripe write category and storage stripes classified into the default category. The storage stripes classified in the partial stripe write category are ordered prior to, or prioritized, over storage stripes classified into the default category, but given less priority than storage stripes classified into the full stripe write category. The storage stripes classified into the default category are ordered following, or given lower priority than, the storage stripes classified into the full stripe write category and storage stripes classified into the partial stripe write category.

In some examples, storage stripes within each category are further sorted to prioritize storage stripes within each category. For example, storage stripes within each category may be further sorted based on fullness of the storage stripes. By writing stripes with more dirty sectors first, the cache is recycled faster. Fullness may refer to an amount, ratio or percentage corresponding to the amount of dirty sectors within the storage stripe. For example, fullness may refer to a ratio or percentage of dirty sectors to clean sectors within a storage stripe. Storage stripes having greater fullness may be prioritized for cache flushing over storage stripes having lower fullness in the same category. In this example, the storage stripes that have greater fullness are flushed from the cache prior to other storage stripes in the category having lesser fullness, thereby providing the advantage of faster cache recycling and freeing the cache for accepting a greater number of I/O operations (for example, I/O operations initiated by hosts).

At action 210, the storage controller triggers a cache flush. In some examples, the storage controller performs cache flushing based on the cache storing an amount of data that exceeds one or more thresholds. The comparing between the amount of data stored by the cache and the thresholds may be performed when data is written to the cache, or at some other time based on an event. For example, receiving data in the cache, a storage controller shutdown or startup, a timer event, detecting an idle or low processing period, or other event may trigger cache flushing.

In some examples, a storage controller provides a plurality of thresholds. A first threshold that is exceeded may trigger a cache flush of a first number of storage stripes, a second threshold that is exceeded may trigger a cache flush of a second number of storage stripes, a third threshold that is exceeded may trigger a cache flush of a third number of storage stripes, and so forth. In this example, higher cache thresholds being exceeded trigger higher numbers of storage stripes being flushed from the cache to storage devices.

At action 212, a cache flush has been triggered, and the storage controller flushes the cache to the storage devices. Flushing the cache may include, for example, writing one or more storage stripes to the storage devices in an ordering based on the sorting. For example, the flush ordering may provide that the storage stripes classified into the full stripe write category are flushed first, the storage stripes classified into the partial stripe write category are flushed second, and the storage stripes classified into the default category are flushed last. Further, within each category, storage stripes may be flushed according to the sorted order within the category. For example, the storage stripes may be flushed within the category according to the fullness sorting. As described above, the number of storage stripes to write to the storage devices may depend upon a cache threshold. For example, an amount of data in the cache that exceeds a lower threshold may trigger a cache flush of a lower number of storage stripes than an amount of data in the cache that exceeds a higher threshold.

Figure 3A:
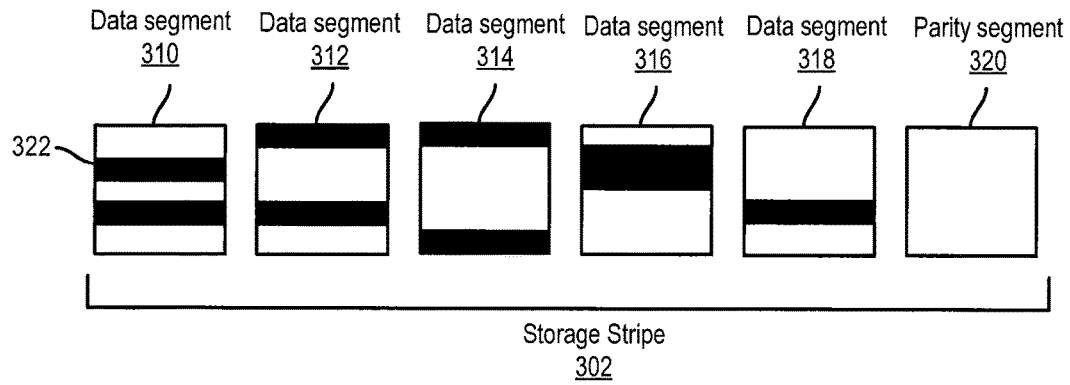
FIGS. 3A, 3B and 3C are schematic diagrams of exemplary storage stripe layouts according to aspects of the present disclosure.
Figure 3B:
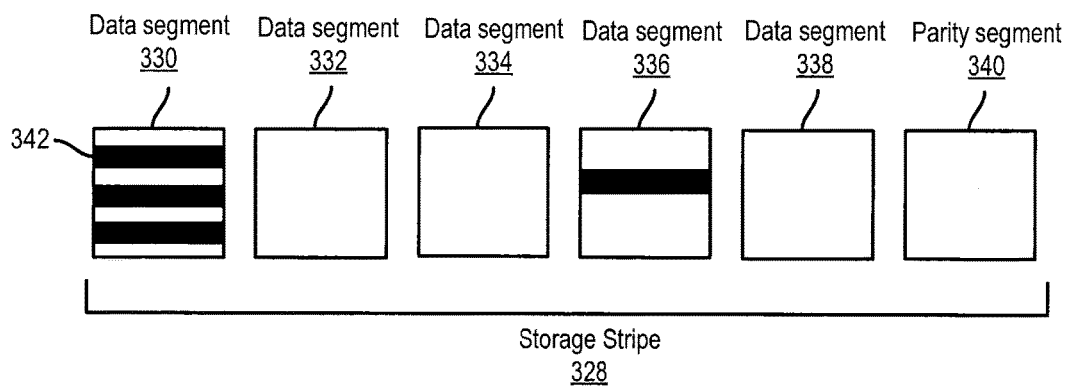
Figure 3C:
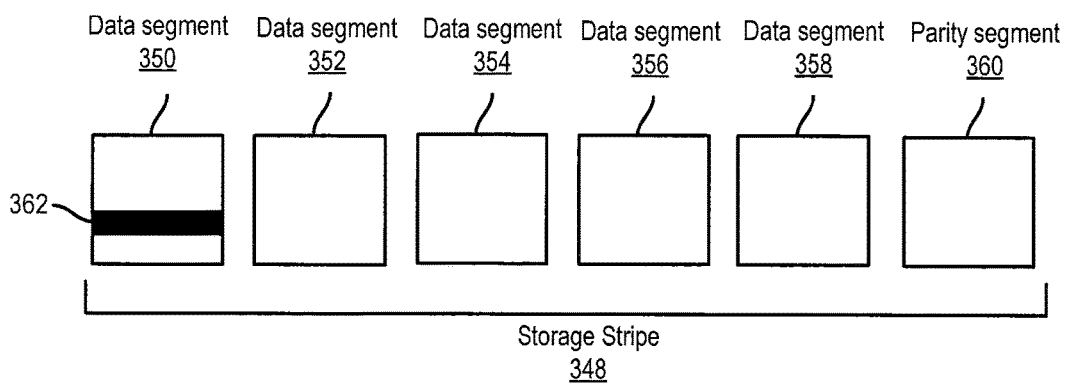

FIGS. 3A, 3B and 3C are schematic diagrams of storage stripe layouts according to aspects of the present disclosure.

In some examples, storage devices (e.g. storage devices 114) are structured to include block-level striping, such that data is split across two or more storage devices. In some examples, storage devices include one or more storage devices that store parity information corresponding to the storage stripes. For example, storage devices may be structured as RAID 5. A RAID 5 configuration may be structured to include a number of storage devices that store a plurality of storage stripes. Each storage stripe may be structured to include any number of data segments (e.g., five) and a parity segment, with each of the data segments and parity segment stored on a different storage device. Each data segment may be structured with a plurality of data sectors that store data. A write of a parity segment from the cache to a storage device may additionally include computing an updated parity segment and writing the updated parity segment to the storage device rather than the original parity segment.

FIGS. 3A, 3B and 3C include some examples of block-level striping for a RAID 5 configuration. In other examples, however, the system and method described herein may be performed using other data storage configurations including RAID 6 and other multi-parity schemes.

FIG. 3A illustrates an exemplary storage stripe 302 that may be classified into a full stripe write category. Storage stripe 302 includes any number of data segments, of which five are shown: data segments 310, 312, 314, 316, and 318. In the present example, storage stripe 302 includes a parity segment 320. The storage stripe also includes dirty sectors, each of which is illustrated as a shaded portion of a data segment. The shaded portions of the data segments represent portions of the data segments with corresponding data in the cache (e.g. controller cache 118A and/or 118B) that have not yet been written to disk. For example, dirty sector 322 is one of two dirty sectors that are included within data segment 310 in the storage stripe 302.

Each data segment may correspond to a particular storage device of a group of storage devices (e.g., storage devices 114). For example, in the illustrated RAID 5 embodiment, a storage stripe may be defined over six storage devices. Each of the five storage devices may store a corresponding data segment of the storage stripe 302, and the sixth storage device may store the parity segment of the storage stripe 302.

In the present example, data segment 310 includes two dirty sectors that are non-contiguous. Data segment 312 includes two dirty sectors that are non-contiguous. Data segment 314 includes two dirty sectors that are non-contiguous. Data segment 316 includes two dirty sectors that are contiguous. Data segment 318 includes one dirty sector.

Parity segment 320 may include a checksum or other parity configuration to identify whether the storage stripe 302 is valid.

In the present example, a storage controller (e.g., storage controller 108A) may classify the storage stripe into a full stripe write category based on one or more of the following locality and/or amount criteria: each data segment in the storage stripe 302 including at least one dirty sector; a majority of the data segments in the storage stripe 302 including at least one dirty sector; a threshold amount of dirty sectors in the storage stripe 302 being exceeded; a number of I/O operations for a partial stripe write of the storage stripe 302 exceeding a number of I/O operations for a full stripe write of the storage stripe 302; at least two data segments of the storage stripe 302 having dirty sectors; and a threshold amount of data segments having contiguous dirty sectors being exceeded. In some examples, the classification of the storage stripe into the full stripe write category may be referred to as an aggressive selection of a full stripe write for a storage stripe. The aggressive selection of the full stripe write classification may allow reductions in a total number of I/O operations performed by the storage system, thereby increasing its capability to process I/O operations received from hosts. An additional benefit may include reducing small I/O operations to SSDs, which may improve endurance of the SSDs.

In the present example, a partial stripe write includes writing dirty sectors of a storage stripe to storage devices, where the entire storage stripe is not written to storage devices. For example, a partial amount of a storage stripe may be written to storage devices that is less than the full amount of the storage stripe.

A number of operations for a partial stripe write and a full stripe write may be determined in order for a storage controller to identify whether performing a full stripe write would be more efficient than performing a partial stripe write. In the present example, the number of operations is based upon a number of storage device accesses that would be performed to flush dirty sectors from the cache to the storage devices. Reducing the number of storage device accesses may offer the advantage of increasing the life span of SSDs included among the storage devices.

A number of I/O operations for a partial stripe write may be determined by multiplying each dirty sector by a number of operations used to write the dirty sector from the cache to the storage devices. In some examples, a write of a dirty sector from the cache to storage includes a read-modify-write (RMW) that includes four read and write operations: (1) a read of the old value from storage corresponding to the dirty sector, (2) a read of the old parity value from storage corresponding to the dirty sector, parity is computed using the new dirty data in the cache and the old data and the old parity that was read from the disk, then (3) a write of the new value of the dirty sector to the storage from the cache, and (4) a write of a new parity value to the storage. Accordingly, the RMW includes two read operations and two write operations for flushing a dirty sector from the cache to storage (four read and write operations total). In the present example, there are nine dirty sectors, which when multiplied by the number of operations to copy each dirty sector to storage (e.g., four in the present example) results in thirty-six I/O operations.

In the present example, a full stripe write includes writing dirty sectors of a storage stripe to storage devices, where the entire stripe is written to the storage devices. A full stripe write may include reading the entire data from data segments 310, 312, 314, 316, 318 and parity segment 320 of the storage stripe 302 and writing the data to the storage devices. In the present example, the full stripe write includes: (1) for each data segment, reading interleaving clean sectors from storage; (2) merging the interleaving clean sectors with the dirty sectors in the cache for each segment; and (3) writing the merged clean sectors and dirty sectors to the storage devices of the storage stripe. Therefore, for a full stripe write, a read operation may be performed from the storage devices for each data segment (five reads), a write may be performed to write each data segment containing the merged clean and dirty sectors to the storage devices (five writes), and the new parity may be computed and written to a storage device that includes the parity segment (one write). Accordingly, in the present example, the number of I/O operations for a full stripe write is eleven operations.

In the present example, the number of I/O operations for performing a partial stripe write is greater than the number of I/O operations for performing a full stripe write, since a partial stripe write includes thirty-six device I/O operations and a full stripe write includes eleven device I/O operations. Thus, the storage controller may determine that a full stripe write for the storage stripe 302 is more efficient than a partial stripe write of the storage stripe 302. The storage controller therefore may determine that the storage stripe 302 should be classified into the full stripe write category.

FIG. 3B illustrates an exemplary storage stripe 328 that may be classified into a partial write category. Storage stripe 328 includes any number of data segments, of which five are shown: data segments 330, 332, 334, 336, and 338. In the present example, storage stripe 328 includes a parity segment 340. The storage stripe also includes dirty sectors, each of which is illustrated as a shaded portion of a data segment. The shaded portions of the data segments represent portions of the data segments with corresponding data in the cache (e.g. controller cache 118A and/or 118B) that have not yet been written to disk. For example, dirty sector 342 is one of three dirty sectors that are included within data segment 330 in the storage stripe 328.

Each data segment may correspond to a particular storage device of a group of storage devices (e.g., storage devices 114). For example, in the illustrated RAID 5 embodiment, a storage stripe may be defined over six storage devices. Each of the five storage devices may store a corresponding data segment of the storage stripe 328, and the sixth storage device may store the parity segment of the storage stripe 340.

In the present example, data segment 330 includes three dirty sectors that are non-contiguous because they are separated by clean sectors. Data segment 336 includes one dirty sector. Data segments 332, 334, and 338 include clean sectors only. Parity segment 340 may include a checksum or other parity configuration to identify whether the storage stripe 328 is valid.

In the present example, a storage controller (e.g., storage controller 108A) may classify the storage stripe into a full stripe write category based on locality and/or amount criteria as discussed above. If the storage stripe 328 does not meet the locality and/or amount criteria to be classified into the full stripe write category, the storage controller may classify the storage stripe 328 into a partial stripe write category based on one or more of the following locality and/or amount criteria: at least two data segments in the storage stripe 302 including at least one dirty sector; a threshold amount of dirty sectors in the storage stripe 302 being exceeded; a data segment of the storage stripe 302 having at least two dirty sectors; a threshold amount of data segments having contiguous dirty sectors being exceeded; and a number of I/O operations for a separate write of each dirty sector of a segment exceeding a number of I/O operations for write of a segment-sized block of a data segment.

In the present example, the storage stripe 328 may be classified into the partial stripe write category based on data segments 330 and 336 including dirty sectors and/or data segment 330 including more than one dirty sector. The storage controller may identify data segment 330 as a segment to read/write as a segment-sized block rather than reading/writing each dirty sector on an individual basis. For example, using the above RMW number of I/O operations per dirty sector, data segment 330 would have twelve I/O operations performed to flush data segment 330 to storage if each sector is flushed separately (e.g., four I/O operations for each of the three dirty sectors). In addition, flushing data segment 336 would include an additional four I/O operations. Accordingly, flushing storage stripe 328 from the cache to the storage devices would include a total of sixteen I/O operations.

However, if the data segment 330 is flushed to storage in a segment-sized block, four I/O operations would be performed to flush the data segment 330 to storage. In more detail, the data segment 330 would be read as a segment-sized block, the parity segment 340 would be read, the data segment 330 would be written to storage, and the parity segment 340 would be written to storage. In addition, flushing data segment 336 would include an additional four I/O operations. Accordingly, if data segment 330 is flushed from the cache in a segment-sized block, flushing storage stripe 328 from the cache to the storage devices would include eight I/O operations.

In the above examples, the number of I/O operations for performing a write of each dirty sector individually is greater than a write of the storage stripe 328 using at least one segment-sized block. Thus, if the criteria for classifying the storage stripe 328 in the partial stripe write category includes the comparison of the number of I/O operations, then the storage stripe 328 would be classified in the partial stripe write category. In the present example, writing data in segment-sized blocks aligns the writes to the flash erase block size of SSDs of the storage devices, which offers the advantages of reducing RMW operations on the SSDs, thereby improving performance and SSD life span.

FIG. 3C illustrates an exemplary storage stripe 348 that may be classified into a default category. Storage stripe 348 includes any number of data segments, of which five are shown: data segments 350, 352, 354, 356, and 358. In the present example, storage stripe 348 includes a parity segment 360. The storage stripe also includes a dirty sector 362, which is illustrated as a shaded portion of a data segment.

Each data segment may correspond to a particular storage device of a group of storage devices (e.g., storage devices 114). For example, in the illustrated RAID 5 embodiment, a storage stripe may be defined over six storage devices. Each of a first five storage devices may store a corresponding data segment of the storage stripe 348, and the sixth storage device may store the parity segment of the storage stripe 348.

In the present example, data segment 350 includes a dirty sector 362. Data segments 352, 354, 356 and 358 do not include any dirty sectors. Parity segment 360 may include a checksum or other parity configuration to identify whether the storage stripe 348 is valid. A write of a parity segment (e.g., parity segment 360) from the cache to a storage device may additionally include computing an updated parity segment and writing the updated parity segment rather than the original parity segment.

In the present example, the storage controller may classify the storage stripe 348 into the default category if the criteria for being classified into the full stripe write category (e.g., as discussed with respect to FIG. 3A) is not met and if the criteria for being classified into the partial stripe write category (e.g., as discussed with respect to FIG. 3B) is not met. For example, because storage stripe 348 includes a single dirty sector, the storage controller may identify that there is no I/O operation performance savings by writing the storage stripe 348 using a full stripe write to storage, or by writing the data segment 350 to the storage in a segment-sized block. Accordingly, storage stripe 348 may be classified into the default category.

Figure 4:
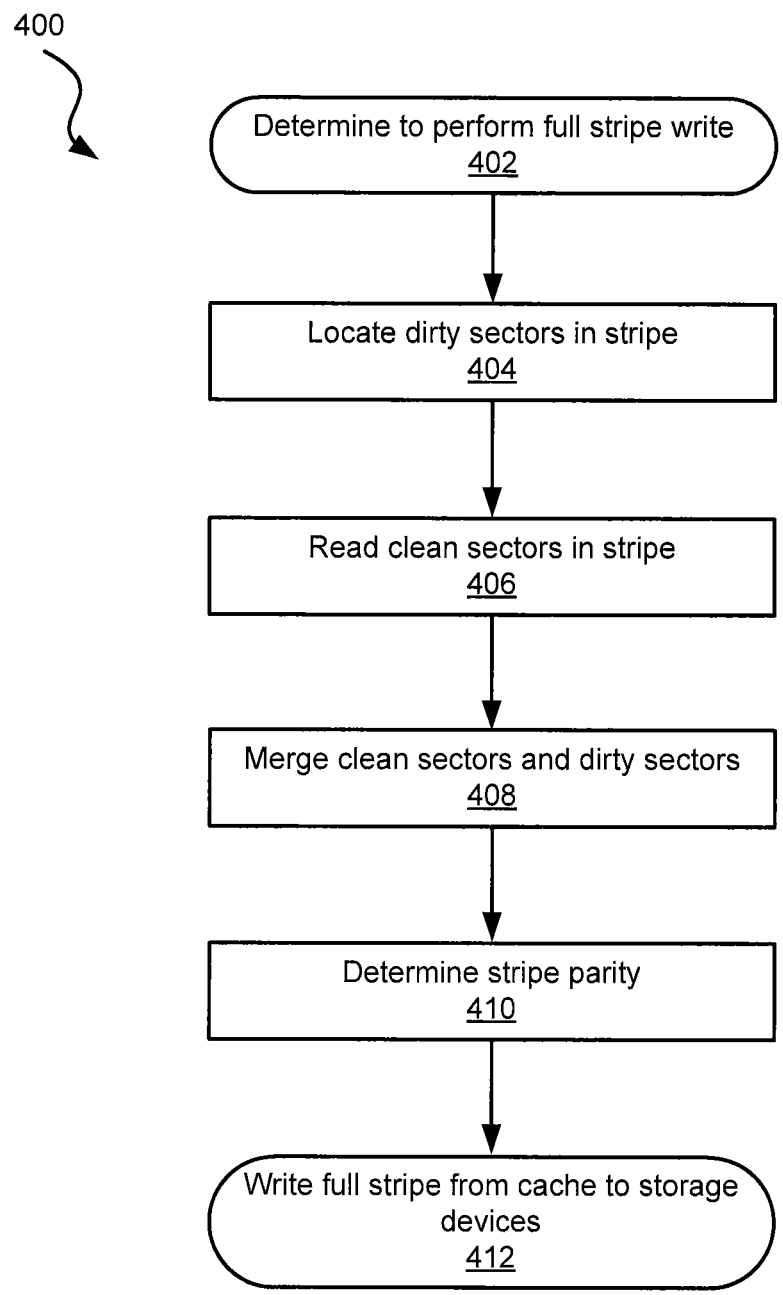
FIG. 4 is a flow diagram of a method of performing a full stripe write according to aspects of the present disclosure.

FIG. 4 is a flow diagram illustrating a method of performing a full stripe write, according to some examples of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 400, and that some of the steps described can be replaced, eliminated and/or re-ordered for other embodiments of the method 400.

It will be recognized that the storage controllers can ensure that writes to the storage devices are atomic (for an atomic transaction, all data involved is either written or, in the event of a failure, remains in or returns to its original state) in several different ways. For example, the storage controllers may mirror data so that should one controller fail, a remaining storage controller can restore the data to its state before the write. However, it is also possible to leverage the nature of the storage devices in order to ensure atomicity without mirroring. This may relieve the burden on the mirror channel and may free cache space on the storage controller serving as the mirror.

In some examples, the storage controllers rely on a write-back cache incorporated into the storage device. Because the data is first written to the storage device's cache, should the write fail, any values written to this cache can be invalidated and the data on the underlying storage medium remains unchanged. In some examples, the storage controllers rely on a wear-leveling mechanism or other mechanism of the storage device that ensures that subsequent writes to the same logical address store data in different physical locations of the underlying storage medium. SSD storage devices in particular map logical block addresses to the physical pages of the underlying storage medium and vary the mapping each time data is written so that frequently written data does not wear out the memory cells as quickly. Because the wear-leveling mechanism writes data to a different physical location, the old data is preserved and can be "recovered" by merely changing the mapping to point to the old data should the write fail.

In these examples and others, the storage controllers can recover from issues such as unreadable sectors or other data corruptions that may be caused due to an interruption of the ensuing write operation without mirroring to the cache of another controller. Thus, the method avoids the redundant mirror operation and improves efficiency of writes, in particular, by using the full stripe write to avoid some mirroring and data marking operations.

At action 402, a storage controller determines to perform a full stripe write operation corresponding to a storage stripe. In some examples, the determination is performed based on criteria as described above with respect to FIG. 2 and FIGS. 3A-C.

At action 404, the storage controller identifies dirty sectors of the storage stripe in the controller cache.

At action 406, the storage controller reads the clean sectors of the storage stripe from the storage devices. In the present example, the clean data sectors are the data sectors that are up-to-date on the storage devices and thus, do not have a corresponding dirty sector in the controller cache. The storage controller may determine that the storage devices ensure atomicity on their own, and based on this determination, the clean sectors read from the storage devices are not mirrored to an alternate controller cache or storage controller.

At action 408, the clean sectors in the storage stripe read from storage are merged with the dirty sectors located in the cache.

At action 410, the storage controller determines new parity values for one or more parity segments corresponding to the merged data in the stripe.

At action 412, the full storage stripe is written from the cache to storage devices. This may include writing both the data segments (including the merged clean and dirty sectors) and the parity segment(s) to the storage devices. In some examples, the segments are written such that the old values are preserved and not overwritten at least until the transaction completes on all of the storage devices. For example, the data and parity segments may be written to integrated caches of the storage devices without writing to the underlying storage media and/or the segments may be written to different physical locations on the underlying storage media than the clean sectors were read from. In this way, the technique of method 400 may provide atomicity without the overhead of mirroring data across storage controllers.

The present embodiments can take the form of an entirely hardware embodiment, an entirely software embodiment, or an embodiment containing both hardware and software elements. In that regard, in some embodiments, the computing system is programmable and is programmed to execute processes including those associated with the processes of methods 200 and/or 400 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, the storage controllers 108A and 108B and/or one or more processors running in one or more of the storage system 104 or the hosts 102 execute code to implement the actions described above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   storing data in a cache, by a storage controller, the data being associated with one or more sectors of a storage stripe that is defined over a plurality of storage devices;

identifying a locality of dirty sectors of the one or more sectors including determining a first amount of operations to perform a partial stripe write of the dirty sectors of the storage stripe from the cache to the plurality of storage devices, and a second amount of operations to perform a full stripe write;
classifying the storage stripe into a partial stripe write category in response to the first amount of operations being less than the second amount of operations; and
flushing the dirty sectors from the cache to the plurality of storage devices as the partial stripe write based on the classification of the storage stripe into the partial stripe write category.

2. The method of claim 1, wherein the identifying of the locality of the dirty sectors includes:
identifying that at least one data segment of the storage stripe includes contiguous dirty sectors.

3. The method of claim 1, wherein the identifying of the locality of the dirty sectors includes:
identifying that a plurality of data segments of the storage stripe include at least one dirty sector.

4. The method of claim 1, the method further comprising:
identifying that an amount of dirty sectors in the storage stripe exceeds a predefined threshold.

5. The method of claim 1, wherein the determining the first amount of comprises determining an amount of operations to write a data segment of the storage stripe in a segment-sized block that is aligned to a flash erase block size of a solid state drive.

6. The method of claim 1, the method further comprising:
identifying that an amount of dirty sectors in the cache exceeds a predetermined threshold.

7. A non-transitory machine readable medium having stored thereon instructions for performing a cache flushing method comprising machine executable code which when executed by at least one machine, causes the machine to:
store data in a cache, the data associated with one or more sectors of a storage stripe that is defined over a plurality of storage devices;
identify a locality corresponding to dirty sectors of the one or more sectors, the identifying of the locality including determining a first amount of operations to perform a partial stripe write of the dirty sectors of the storage stripe from the cache to the plurality of storage devices, and a second amount of operations to perform a full stripe write;
classify the storage stripe into a partial stripe write category in response to the first amount of operations being less than the second amount of operations; and
flush the cache to the plurality of storage devices as the partial stripe write based on the classification of the storage stripe into the partial stripe write category.

8. The non-transitory machine readable medium of claim 7, wherein the identifying of the locality includes:
identifying that an amount of dirty sectors exceeds a predetermined threshold.

9. The non-transitory machine readable medium of claim 7, the identifying of the locality further comprising:
identifying that each data segment of the storage stripe includes at least one dirty sector.

10. The non-transitory machine readable medium of claim 7, wherein the determining the first amount of operations includes determining an amount of operations to write a data segment of the storage stripe in a segment-sized block that is aligned to a flash erase block size.

11. A computing device comprising:
a memory containing machine readable medium comprising machine executable code having stored thereon instructions for performing a method of cache flushing;
a processor coupled to the memory, the processor configured to execute the machine executable code to cause the processor to:
store data in a cache the data being associated with one or more sectors of a storage stripe that is defined over a plurality of storage devices;
identify a locality of dirty sectors of the one or more sectors including determining a first amount of operations to perform a partial stripe write of the dirty sectors of the storage stripe from the cache to the plurality of storage devices, and a second amount of operations to perform a full stripe write;
classify the storage stripe into a partial stripe write category in response to the first amount of operations being less than the second amount of operations; and
flush the dirty sectors from the cache to the plurality of storage devices as the partial stripe write based on the classification of the storage stripe into the partial stripe write category.

12. The computing device of claim 11, wherein the identifying of the locality of the dirty sectors includes:
identifying that at least one data segment of the storage stripe includes contiguous dirty sectors.

13. The computing device of claim 11, wherein the identifying of the locality of the dirty sectors includes:
identifying that each data segment of the storage stripe includes at least one dirty sector.

14. The computing device of claim 11, wherein the determining the first amount of operations includes determining an amount of operations to write a data segment of the storage stripe to a in a segment-sized block that is aligned to a flash erase block size of a solid state drive.

15. The method of claim 1, wherein the determining the first amount of operations further comprises:
determining a product of an amount of dirty sectors of the storage stripe and an amount of operations to read and write each dirty sector from the cache to the storage devices.

16. The non-transitory machine readable medium of claim 7, wherein the determining the first amount of operations further comprises:
determining a product of an amount of dirty sectors of the storage stripe and an amount of operations to read and write each dirty sector from the cache to the storage devices.

17. The computing device of claim 11, wherein the determining the first amount of operations further comprises:
determining a product of an amount of dirty sectors of the storage stripe and an amount of operations to read and write each dirty sector from the cache to the storage devices.

18. The computing device of claim 11, the processor further configured to execute the machine executable code to cause the processor to:
classify the storage stripe into a full stripe write category in response to the second amount of operations being less than the first amount of operations.

19. The computing device of claim 18, the processor further configured to execute the machine executable code to cause the processor to:

flush the storage stripe from the cache to the plurality of storage devices using the full stripe write based on the classification of the storage stripe into the full stripe write category.

20. A non-transitory machine readable medium having stored thereon instructions for performing a cache flushing method comprising machine executable code which when executed by at least one machine, causes the machine to:

store data in a cache, the data associated with one or more sectors of a storage stripe that is defined over a plurality of storage devices;

identify a locality corresponding to dirty sectors of the one or more sectors, the identifying of the locality including determining a first amount of operations to perform a partial stripe write of the dirty sectors of the storage stripe from the cache to the plurality of storage devices, and a second amount of operations to perform a full stripe write;

compare the first amount of operations and the second amount of operations to determine which results in a lower amount of operations; and generate a command to flush the cache by the partial stripe write or the full stripe write that provides the lower amount of operations based on a result of the compare.

21. The non-transitory machine readable medium of claim 20, wherein the machine executable code, when executed by the at least one machine, further causes the machine to:

flush the cache by the partial stripe write in a segment-sized block aligned to a flash erase block size of a storage device from among the plurality of storage devices corresponding to the dirty sectors.

22. The non-transitory machine readable medium of claim 21, wherein the machine executable code, when executed by the at least one machine, further causes the machine to: interleave clean data from the storage device with the dirty sectors to write the flushed dirty sectors together with the interleaved clean data as the segment-sized block aligned to the flash erase block size.

23. The non-transitory machine readable medium of claim 20, wherein the machine executable code, when executed by the at least one machine, further causes the machine to:

prioritize the partial stripe write or the full stripe write with respect to other stripes of dirty data in the cache in a same partial stripe write category or full stripe write category based on a number of dirty sectors in each stripe of dirty data in the same partial stripe write category or full stripe write category.

* * * * *